(12) United States Patent
Roffe et al.

(10) Patent No.: US 9,670,960 B2
(45) Date of Patent: Jun. 6, 2017

(54) RADIAL ROLLING BEARING ASSEMBLY WITH CONNECTOR SLEEVE

(71) Applicant: SCHAEFFLER TECHNOLOGIES GMBH & CO. KG, Herzogenaurach (DE)

(72) Inventors: Dennis Roffe, Fort Mill, SC (US); Charles Schwab, Fort Mill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/579,295

(22) Filed: Dec. 22, 2014

(65) Prior Publication Data
US 2016/0178011 A1    Jun. 23, 2016

(51) Int. Cl.
| F16C 19/40 | (2006.01) |
| F16C 33/37 | (2006.01) |
| F16C 35/06 | (2006.01) |
| F16C 19/54 | (2006.01) |
| F16C 33/58 | (2006.01) |
| F16C 19/46 | (2006.01) |

(52) U.S. Cl.
CPC ............ *F16C 35/061* (2013.01); *F16C 19/54* (2013.01); *F16C 33/588* (2013.01); *F16C 19/46* (2013.01); *F16C 2361/61* (2013.01)

(58) Field of Classification Search
CPC ........ F16C 35/061; F16C 19/54; F16C 19/48; F16C 33/605; F16C 2226/70; F16C 33/37; F16C 33/372; F16C 33/374; F16C 33/4605; F16C 33/588; F16C 19/46; F16C 2361/61

USPC ................................ 384/551, 559, 561, 564
See application file for complete search history.

(56) References Cited

U.S. PATENT DOCUMENTS

| 3,501,210 | A | | 3/1970 | Deutsch | |
| 3,926,484 | A | | 12/1975 | Parkins | |
| 4,244,630 | A | * | 1/1981 | Tischer | F04D 29/049 384/494 |
| 4,749,288 | A | * | 6/1988 | Tilch | F16C 19/386 384/428 |
| 4,798,482 | A | * | 1/1989 | Kruk | F16C 19/385 384/559 |
| 5,058,262 | A | * | 10/1991 | Brockmuller | B21K 25/00 29/725 |
| 5,121,998 | A | * | 6/1992 | Bhatia | F16C 19/386 384/448 |
| 5,492,419 | A | * | 2/1996 | Miller | F16C 19/386 384/477 |

(Continued)

*Primary Examiner* — Adam Rogers
(74) *Attorney, Agent, or Firm* — Volpe and Koenig, P.C.

(57) ABSTRACT

A radial rolling bearing assembly is provided which includes first and second radial rolling bearings having respective bearing cups that include respective bearing races, respective radially extending flanges at first axial ends and respective bearing axial flanges with respective connector elements at the second axial ends. Respective cages hold rolling elements in the bearing cups that contact the races and define respective bearing support surfaces that can support, for example, a shaft or housing. A connector sleeve connects the first and second radial rolling bearings. The connector sleeve includes a first axial end with a first complementary connector that engages the first connector element, and a second axial end with a second complementary connector that engages the second connector element.

18 Claims, 6 Drawing Sheets

(56) References Cited

U.S. PATENT DOCUMENTS

| | | | | |
|---|---|---|---|---|
| 6,786,645 B2* | 9/2004 | Joki | ............... | B60B 27/001 |
| | | | | 384/480 |
| 6,971,802 B2* | 12/2005 | Vezina | ............... | F16C 19/54 |
| | | | | 384/517 |
| 7,537,390 B2* | 5/2009 | De Boer | ............... | F16C 19/56 |
| | | | | 384/504 |
| 8,764,305 B2* | 7/2014 | Henneberger | ............... | B60B 27/00 |
| | | | | 384/551 |
| 9,371,854 B2* | 6/2016 | Eckhoff | ............... | F16C 19/44 |
| 2010/0027928 A1 | 2/2010 | Draser | | |

* cited by examiner

RADIAL ROLLING BEARING ASSEMBLY WITH CONNECTOR SLEEVE

FIELD OF INVENTION

This application is generally related to rolling bearings and more particularly, to radial rolling bearing arrangements having two or more bearings and at least one spacer.

BACKGROUND

In many applications, multiple bearings used to support a shaft or other rotating components are pressed into a housing as separate parts. These are sometimes installed on opposite sides of a housing or, in some cases, such as automotive transmissions, are installed from the same side with a spacer located therebetween. As vehicle transmissions are challenged to have reduced frictional loses, more applications for the use radial bearings to reduce friction of rotating shafts within housings are available. However, these arrangements have drawbacks in that the bearings are being installed into deeper bores or openings in the housing from one side with a spacer located between them. The bearings are spaced apart in order to provide the largest available spacing between them in order to limit tilt and/or displacement of the shafts supported thereby. This also improves system rigidity. In some applications where individual components are pressed into the bore, this requires two bearings, for example 7, 8 shown in FIG. 1, as well as a spacer 9 to be separately installed into a housing bore. Here one or more of the components may be omitted at assembly or the components may be assembled with an improper sequence (i.e., with the bearings stacked directly together, which may not be immediately visible after assembly through normal quality control procedures). Additionally, damage can result to the housing bore due to pressing multiple separate components through the same bore surface.

It would therefore be desirable to provide a radial rolling bearing assembly that allows for installation of multiple radial bearings into a single bore while avoiding the drawbacks of the known prior art.

SUMMARY

In one embodiment, a radial rolling bearing assembly is provided which includes a first radial rolling bearing having a first bearing cup including a first bearing race with a first radially extending flange at a first axial end and a first bearing axial flange with a first connector element at a second axial end. A first cage holds first rolling elements therein that contact the first bearing race and define a first bearing support surface for contact with an opposite part. A second radial rolling bearing is provided including a second bearing cup having a second bearing race with a second radially extending flange at a first axial end and a second bearing axial flange with a second connector element at a second axial end. A second cage holds second rolling elements therein that contact the second bearing race and define a second bearing support surface for contact with the opposite part. A connector sleeve connects the first and second radial rolling bearings. The connector sleeve includes a first axial end with a first complementary connector that engages the first connector element, and a second axial end with a second complementary connector that engages the second connector element. The assembly provides a unitized, multi-row bearing assembly that is easier to install in a housing or on a shaft in comparison with prior separate parts, and eliminates the possibility of one or more elements being omitted during assembly as well as reduces the possibility of damaging the housing bore during installation.

In one arrangement, the first and second bearing races are outer bearing races, and the first and second radially extending flanges are radially inwardly directed. The first and second bearing support surfaces are inner support surfaces for contact with an opposite part, such as a shaft. In this arrangement, the connector sleeve has an outside diameter that is less than or equal to an outside diameter of the first and the second radial rolling bearings.

In another arrangement, the first and second bearing races are inner bearing races, and the first and second radially extending flanges are radially outwardly directed. The first and second bearing support surfaces are outer support surfaces for contact with an opposite part, such as a housing, and the inner races are in contact, for example, with a shaft to be supported in the housing. In this arrangement, the connector sleeve has an inside diameter that is greater than or equal to an inside diameter of the first and the second radial rolling bearings.

In one preferred arrangement, the first connector element is a first radially outwardly directed flange, and the second connector element is a second radially outwardly directed flange. The first complementary connector element is formed by a first plurality of radially inwardly directed tabs circumferentially spaced apart about the connector sleeve, and the second complementary connector element is formed by a second plurality of radially inwardly directed tabs circumferentially spaced apart about the connector sleeve. Optionally. The direction of the flanges and the tabs could be reversed at one or both ends. This arrangement allows a "snap" connection between the first and second radial bearing assemblies on respective axial ends of the connector sleeve.

Preferably, the connector sleeve is a deep drawn, pressed, and/or punched sheet metal part.

In another aspect, a shaft seal can be located within the connector sleeve. It is also possible for lubrication channels or bores to be provided in the connector sleeve.

In one preferred arrangement, the rolling element are needles.

In the arrangement where the first and second bearing races are outer bearing races, the arrangement can further include a first bearing inner race formed on a shaft supported by the radial rolling bearing assembly. Alternatively, a separate inner race can be provided. Similarly, a second bearing inner race can be formed on the shaft or on a separate second bearing inner ring that is provided.

In another aspect, a connector sleeve for a radial rolling bearing assembly that is adapted to connect first and second radial rolling bearings together is provided. This includes a deep drawn tubular body having a first axial end with a first connector formed by radially inwardly directed tabs, and a second axial end with a second connector formed by radially inwardly directed tabs. Here, the radially inwardly directed tabs are formed as deformations in the tubular body.

Additional preferred arrangements of the bearing assembly having one or more features of the invention are described below and in the claims.

BRIEF DESCRIPTION OF THE DRAWINGS

The foregoing Summary as well as the following Detailed Description will be best understood when read in conjunction with the appended drawings. In the drawings.

DETAILED DESCRIPTION OF THE PREFERRED EMBODIMENTS

Figure 1:
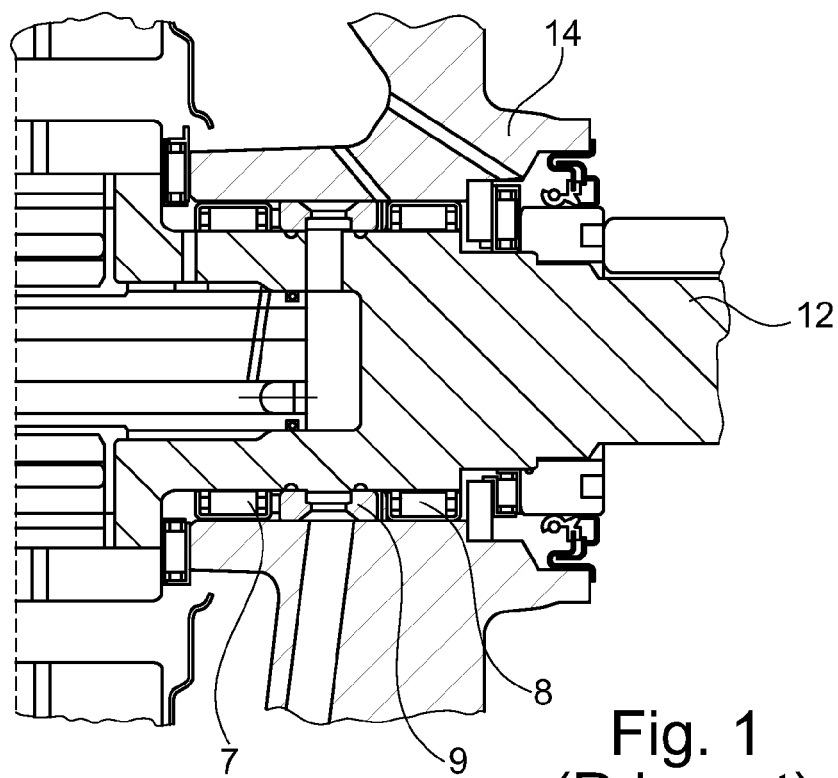
FIG. 1 is a cross-sectional view through a prior art assembly using multiple radial bearings and a spacer to support a shaft within a housing.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivatives thereof, and words of similar import.

Figure 2:
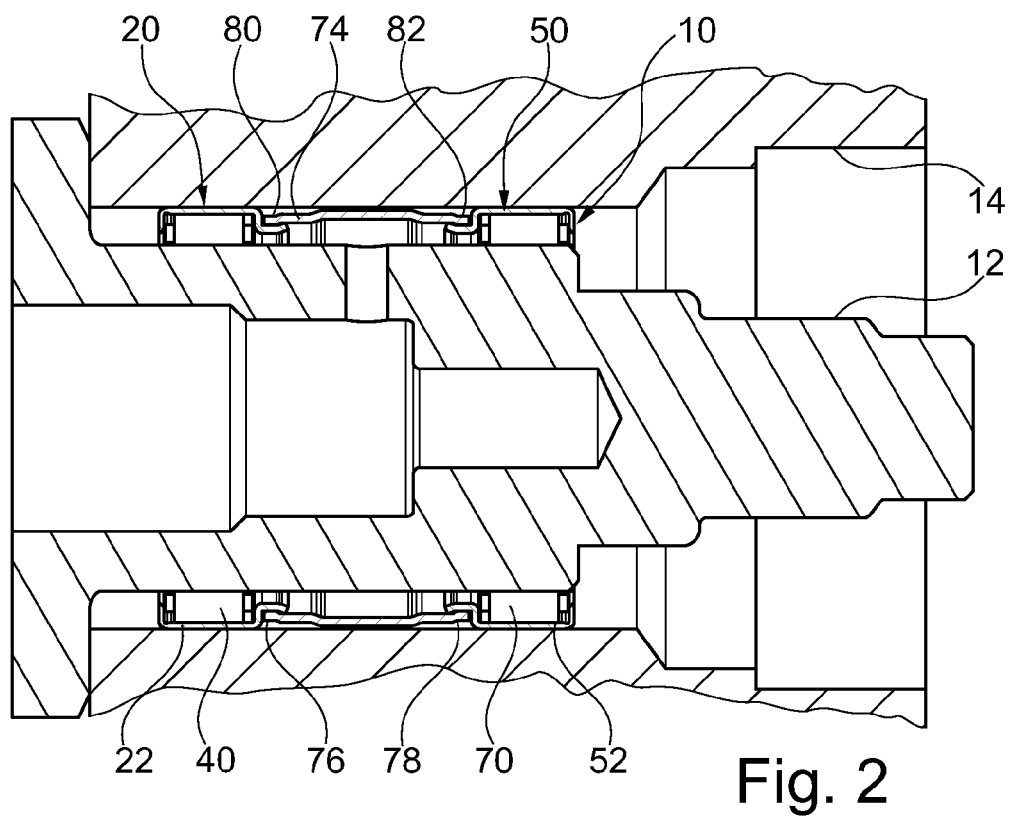
FIG. 2 is a cross-sectional view of a radial rolling bearing assembly supporting a shaft within a housing in accordance with one preferred embodiment.

Referring to FIGS. 2-5, a first embodiment of a radial rolling bearing assembly 10 is shown. The radial rolling bearing assembly 10 is used for example to support a shaft 12 within a housing 14, as shown in FIG. 2. The radial rolling bearing assembly 10 includes a first radial rolling bearing 20 which, as shown in detail in FIG. 3, includes a first bearing cup 22 having a first outer bearing race 24 with a first radially inwardly directed flange 26 at a first axial end 28 thereof. A first bearing axial flange 32 extends from a second axial end 30 of the first bearing cup 22 and includes a first connector element 34. This first connector element 34 is preferably a first radially outwardly directed flange 36. This can extend radially outwardly at an acute angle from an axis of the bearing 20. The first bearing cup 22 is preferably a pressed, punched, and/or stamped sheet metal part formed of bearing grade steel. A first cage 38 having first rolling elements 40 located therein is positioned within the first bearing cup 22. The first rolling elements 40 contact the first bearing outer race 24 and define a first bearing inner support surface which can support, for example, the shaft 12. Preferably, the rolling elements 40 are needles. The needles 40 can roll on a first bearing inner race that can be formed integrally on the shaft 12. Alternatively, a separate inner bearing ring with an inner race can be provided, depending upon the particular application.

Figure 3:
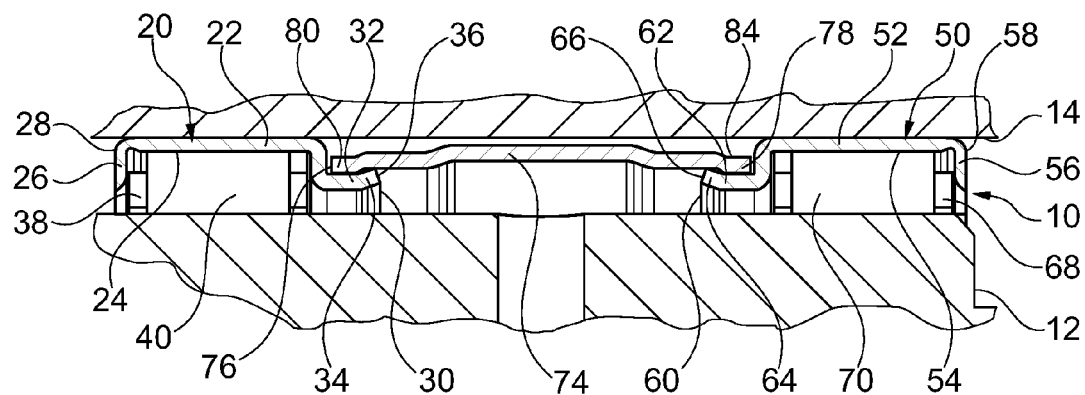
FIG. 3 is an enlarged cross-sectional view showing the radial rolling bearing assembly according to FIG. 2.
Figure 4:
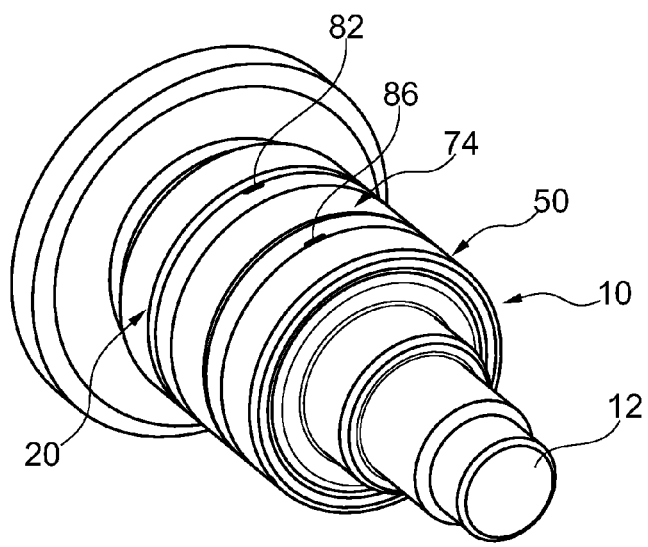
FIG. 4 is a perspective view showing the radial rolling bearing assembly according to FIG. 2 shown on the shaft with the housing being removed for clarity.
Figure 5:
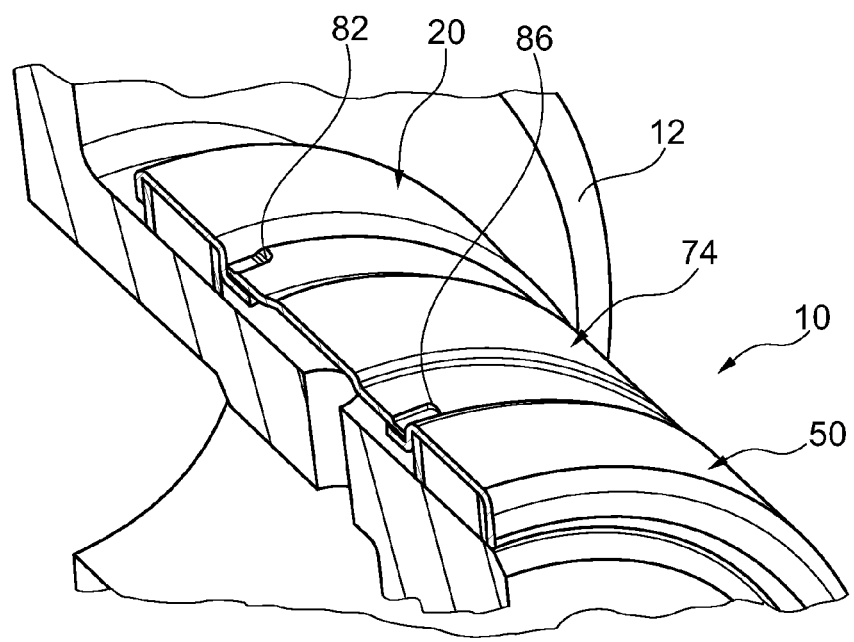
FIG. 5 is an enlarged perspective view, partially in cross-section, showing the radial rolling bearing assembly of FIG. 2 on the shaft.

Still with reference to FIGS. 2-4, a second radial rolling bearing 50 is provided including a second bearing cup 52 having a second bearing outer race 54, a second radially inwardly directed flange 56 at a first axial end 58, and a second bearing axial flange 62 with a second connector element 64 at a second axial end 60. The second connector element 64 is preferably a second radially outwardly directed flange 66. This can also be arranged at an acute angle relative to an axis of the second radial rolling bearing 50. The second bearing cup 52 is produced in a similar manner to the first bearing cup 22. A second cage 68 having second rolling elements 70 located therein is located in the second bearing cup 52. The second rolling elements 70 contact the second bearing outer race 54 and define a second bearing inner support surface. Preferably, the rolling elements 70 are needles. This can also be used to directly support the shaft 12, with a second bearing inner race being provided directly on the shaft 12. Alternatively, a separate second bearing inner ring can be provided, depending upon the particular application.

Referring to FIGS. 2-5, a connector sleeve 74 is provided having an outside diameter that is less than or equal to an outside diameter of the first and second radial rolling bearings 20, 50. The connector sleeve 74 includes a first axial end 76 with a first complementary connector 80 that engages the first connector element 34, and a second axial end 78 with a second complementary connector 84 that engages the second connector element 64. The connector sleeve 74 is preferably a pressed or deep draw sheet metal element. Preferably, the first complementary connector 80 is formed by a first plurality of radially inwardly directed tabs 82 circumferentially spaced apart about the connector sleeve 74. The second complementary connector element is formed by a second plurality of radially inwardly directed tabs 86 circumferentially spaced apart about the connector sleeve. In one preferred embodiment, there are four equally spaced radially, inwardly directed tabs 82 that form the first complementary connector element 80 and four equally spaced radially inwardly tabs 86 that form the second complementary connector element 84. The number of tabs can be varied. Preferably, the tabs 82, 86 are integrally formed by deformation of the tubular sleeve body. Optionally, the direction of one or both of the flanges 36, 66 and one or both of the respective sets of tabs 82, 86 could be reversed. This arrangement allows the first radial rolling bearing 20 and the second radial rolling bearing 50 to be connected to the first and second axial ends of the connector sleeves 74 by a "snap" connection such that the tabs 82, 86 engage over the respective first and second radially outwardly directly flanges 36, 66 of the first and second radial rolling bearings 20, 50. This arrangement also allows the connector sleeve 74 to be rotatable relative to either or both of the first and second radial rolling bearings 20, 50, while allowing the overall radial rolling bearing assembly 10 to be pre-assembled and provided as a single component assembly to a manufacturer so that the radial rolling bearing assembly 10 can be installed in one piece in a bore in the housing 14. This improves quality control as well as prevents the omission of any elements from the bearing assembly which is possible from the known prior art where the two bearings and the spacer sleeve are separately installed.

Figure 6:
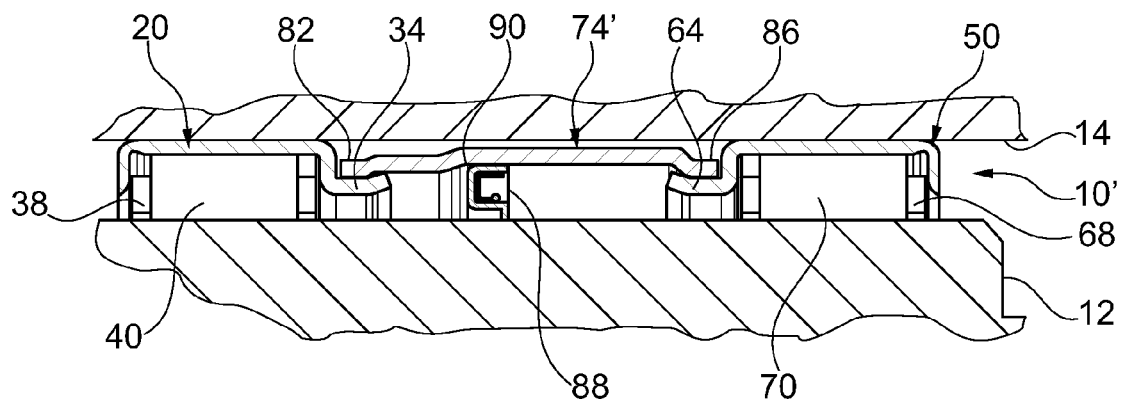
FIG. 6 is a cross-section view of a radial rolling bearing assembly according to a second preferred embodiment which includes a shaft seal.

Referring now to FIG. 6, a second embodiment of a radial rolling bearing assembly 10' is shown. The radial rolling bearing assembly 10' is similar to the first embodiment of the radial rolling bearing assembly 10 and the same part numbers have been used to designate similar elements. To that extent, as the radial rolling bearing assembly 10' includes the first and second radial rolling bearings 20, 50 as described above, the description of these elements will not be repeated. The connector sleeve 74' has been modified to include a shoulder 90 upon which a shaft seal 88 is installed. Thus, an additional function is added to the connector sleeve 74' in providing a seal between the first and second radial rolling bearings 20, 50.

Figure 7:
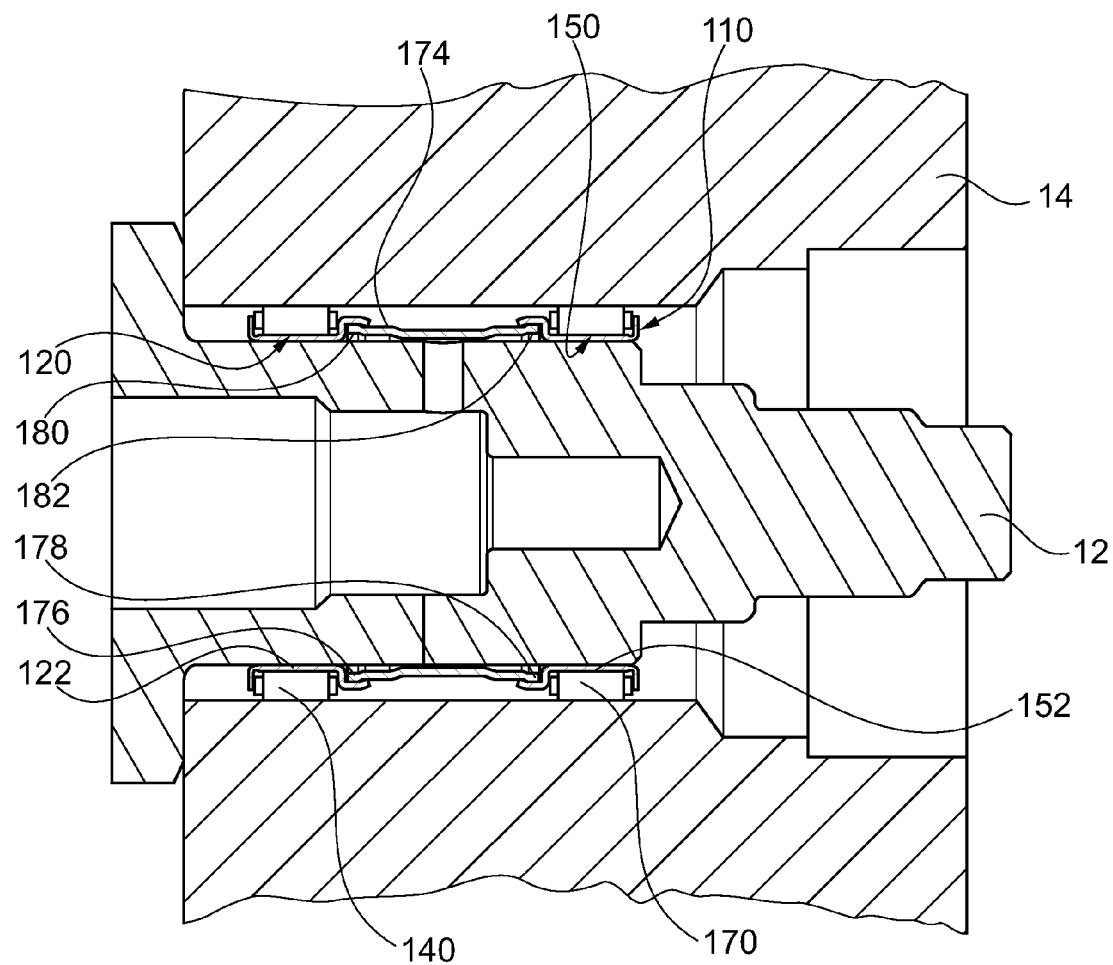
FIG. 7 is a cross-sectional view of a radial rolling bearing assembly supporting a shaft within a housing in accordance with a third preferred embodiment.

Referring to FIGS. 7-10, a third embodiment of a radial rolling bearing assembly 110 is shown. The radial rolling bearing assembly 110 is similar to the radial rolling bearing assembly 10 discussed above, and can used for example to support a shaft 12 within a housing 14, as shown in FIG. 7. The radial rolling bearing assembly 110 includes a first radial rolling bearing 120 which, as shown in detail in FIG. 8, includes a first bearing cup 122 having a first inner bearing race 124 with a first radially outwardly directed flange 126 at a first axial end 128 thereof. A first bearing axial flange 132 extends from a second axial end 130 of the first bearing cup 122 and includes a first connector element 134. This first connector element 134 is preferably a first radially inwardly directed flange 136. This can extend radially inwardly at an acute angle from an axis of the bearing 120. The first bearing cup 122 is preferably a pressed, punched, and/or stamped sheet metal part formed of bearing grade steel. A first cage 138 having first rolling elements 140 located therein is positioned within the first bearing cup 122. The first rolling elements 140 contact the first bearing inner race 124 and define a first bearing outer support surface which can, for example, contact an outer race in the housing 14. Preferably, the rolling elements 140 are needles. The needles 140 can roll on a first bearing outer race that can be formed integrally on or pressed into the housing 14. Alternatively, a separate outer bearing ring with an outer race can be provided, depending upon the particular application.

Figure 8:
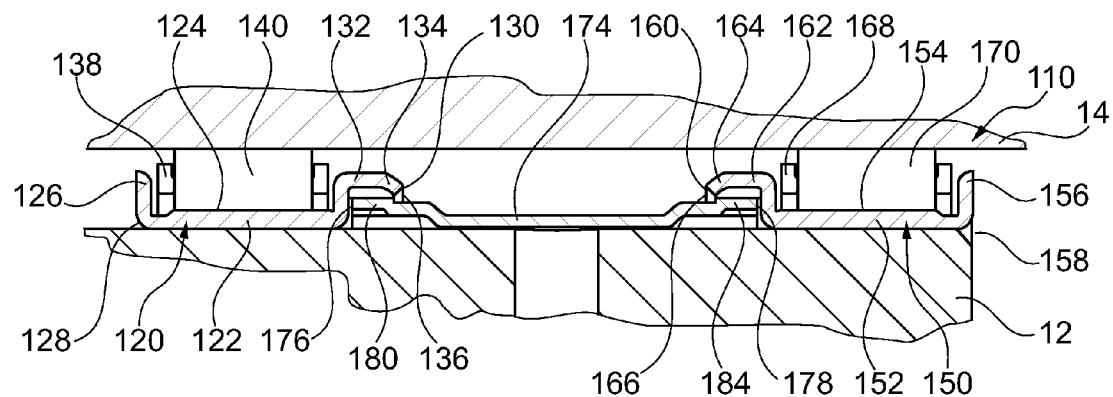
FIG. 8 is an enlarged cross-sectional view showing the radial rolling bearing assembly according to FIG. 7.
Figure 9:
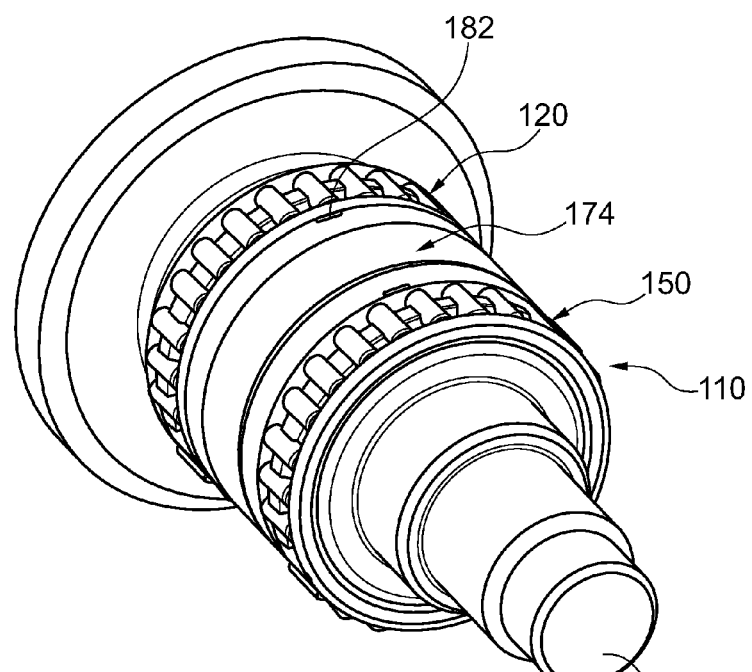
FIG. 9 is a perspective view showing the radial rolling bearing assembly according to FIG. 7 shown on the shaft with the housing being removed for clarity.
Figure 10:
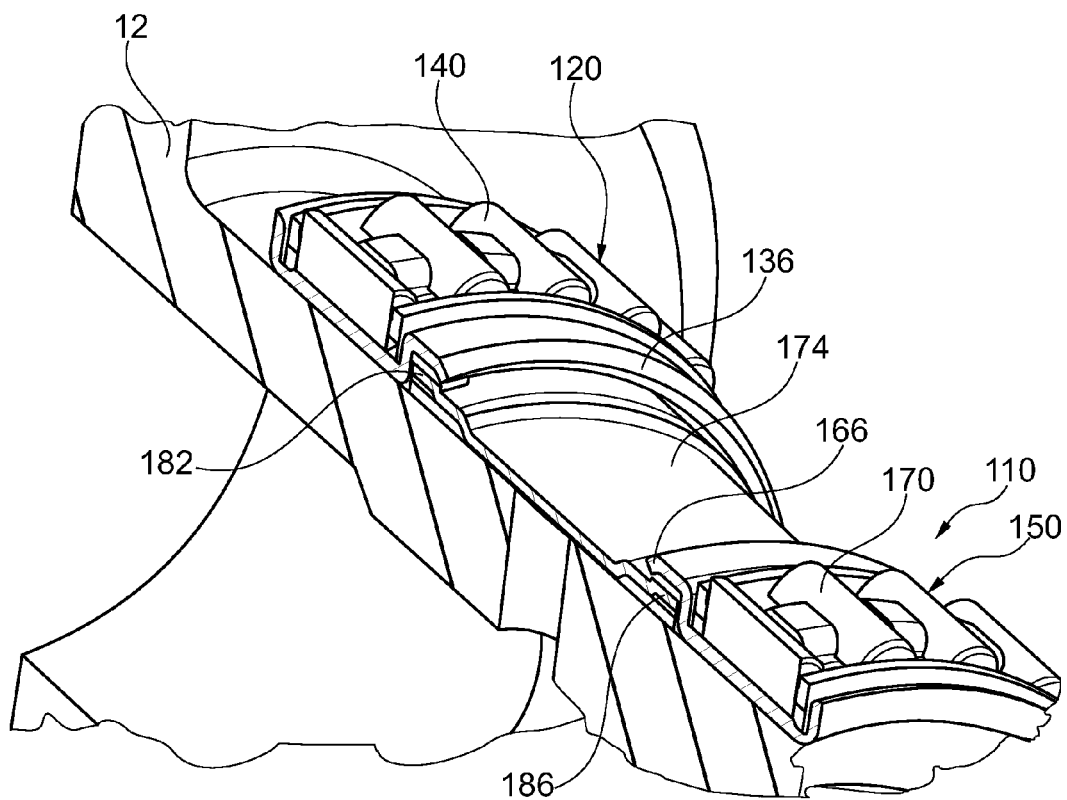
FIG. 10 is an enlarged perspective view, partially in cross-section, showing the radial rolling bearing assembly of FIG. 7 on the shaft.

Still with reference to FIGS. 7-9, a second radial rolling bearing 150 is provided including a second bearing cup 152 having a second bearing inner race 154, a second radially outwardly directed flange 156 at a first axial end 158, and a second bearing axial flange 162 with a second connector element 164 at a second axial end 160. The second connector element 164 is preferably a second radially inwardly directed flange 166. This can also be arranged at an acute angle relative to an axis of the second radial rolling bearing 150. The second bearing cup 152 is produced in a similar manner to the first bearing cup 122. A second cage 168 having second rolling elements 170 located therein is located in the second bearing cup 152. The second rolling elements 170 contact the second bearing inner race 154 and define a second bearing outer support surface. Preferably, the rolling elements 170 are needles. This can also be used to directly contact the housing 14, with a second bearing outer race being provided directly on or pressed into the shaft 14. Alternatively, a separate second bearing outer ring with an outer race can be provided, depending upon the particular application.

Referring to FIGS. 7-10, a connector sleeve 174 similar to the connector sleeve 74 discussed above is provided. The connector sleeve 174 has an inside diameter that is greater than or equal to an inside diameter of the first and second radial rolling bearings 120, 150. The connector sleeve 174 includes a first axial end 176 with a first complementary connector 180 that engages the first connector element 134, and a second axial end 178 with a second complementary connector 184 that engages the second connector element 164. The connector sleeve 174 is preferably a pressed or deep draw sheet metal element. Preferably, the first complementary connector 180 is formed by a first plurality of radially outwardly directed tabs 182 circumferentially spaced apart about the connector sleeve 174. The second complementary connector element is formed by a second plurality of radially outwardly directed tabs 186 circumferentially spaced apart about the connector sleeve. In one preferred embodiment, there are four equally spaced radially outwardly directed tabs 182 that form the first complementary connector element 180 and four equally spaced radially outwardly tabs 186 that form the second complementary connector element 184. The number of tabs can be varied. Preferably, the tabs 182, 186 are integrally formed by deformation of the tubular sleeve body. Optionally, the direction of one or both of the flanges 136, 166 and one or both sets of the respective tabs 182, 186 could be reversed. This arrangement allows the first radial rolling bearing 120 and the second radial rolling bearing 150 to be connected to the first and second axial ends of the connector sleeves 174 by a "snap" connection such that the tabs 182, 186 engage inside the respective first and second radially inwardly directly flanges 136, 166 of the first and second radial rolling bearings 120, 150. This arrangement also allows the connector sleeve 174 to be rotatable relative to either or both of the first and second radial rolling bearings 120, 150, while allowing the overall radial rolling bearing assembly 110 to be pre-assembled and provided as a single component assembly to a manufacturer so that the radial rolling bearing assembly 110 can be installed in one piece.

Having thus described various embodiments of the present radial rolling bearing assembly with connector sleeve in detail, it is to be appreciated and will be apparent to those skilled in the art that many physical changes, only a few of which are exemplified in the detailed description above, could be made in the assembly without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:
1. A radial rolling bearing assembly, comprising:
a first radial rolling bearing including a first bearing cup having a first bearing race with a first radially extending flange at a first axial end and a first bearing axial flange with a first connector element at a second axial end, a first cage, and first rolling elements located in the cage that contact the first bearing race and define a first bearing support surface;
a second radial rolling bearing including a second bearing cup having a second bearing race with a second radially extending flange at a first axial end and a second bearing axial flange with a second connector element at a second axial end, a second cage, and second rolling elements located in the second cage that contact the second bearing race and define a second bearing support surface; and
a connector sleeve including a first axial end with a first connector that engages the first connector element, and a second axial end with a second connector that engages the second connector element,
wherein the first bearing axial flange is connected to the first bearing race by an integrally-formed first radially extending connector flange such that the first bearing axial flange, the first bearing race, and the first radially extending connector flange form an S-shape, and wherein the second bearing axial flange is connected to the second bearing race by an integrally-formed second radially extending connector flange such that the second bearing axial flange, the second bearing race, and the second radially extending connector flange form an S-shape.

2. The radial rolling bearing assembly of claim 1, wherein the first and second bearing races are outer bearing races, the first and second radially extending flanges are radially inwardly directed, and the first and second bearing support surfaces are inner support surfaces for contact with an outer surface of an opposite part.

3. The radial rolling bearing assembly of claim 2, wherein the connector sleeve has an outside diameter that is less than or equal to an outside diameter of the first and the second radial rolling bearings.

4. The radial rolling bearing assembly of claim 2, further comprising a first bearing inner race.

5. The radial rolling bearing assembly of claim 4, wherein the first bearing inner race is formed on a shaft supported by the radial rolling bearing assembly.

6. The radial rolling bearing assembly of claim 5, further comprising a second bearing inner race.

7. The radial rolling bearing assembly of claim 6, wherein the second bearing inner race is formed on the shaft.

8. The radial rolling bearing assembly of claim 1, wherein the first and second bearing races are inner bearing races, the first and second radially extending flanges are radially outwardly directed, and the first and second bearing support surfaces are outer support surfaces for contact with an inner surface of an opposite part.

9. The radial rolling bearing assembly of claim 8, wherein the connector sleeve has an inside diameter that is greater than or equal to an inside diameter of the first and the second radial rolling bearings.

10. The radial rolling bearing assembly of claim 1, wherein the first connector element is a first radially outwardly directed flange, and the second connector element is a second radially outwardly directed flange.

11. The radial rolling bearing assembly of claim 10, wherein the first connector is formed by a first plurality of radially inwardly directed tabs circumferentially spaced apart about the connector sleeve, and the second connector is formed by a second plurality of radially inwardly directed tabs circumferentially spaced apart about the connector sleeve.

12. The radial rolling bearing assembly of claim 1, wherein the first connector element is a first radially inwardly directed flange, and the second connector element is a second radially inwardly directed flange.

13. The radial rolling bearing assembly of claim 12, wherein the first connector is formed by a first plurality of radially outwardly directed tabs circumferentially spaced apart about the connector sleeve, and the second connector is formed by a second plurality of radially outwardly directed tabs circumferentially spaced apart about the connector sleeve.

14. The radial rolling bearing assembly of claim 1, wherein the connector sleeve is a deep drawn or punched sheet metal part.

15. The radial rolling bearing assembly of claim 1, further comprising a shaft seal located within the connector sleeve.

16. The radial rolling bearing assembly of claim 1, wherein the first and second rolling elements are cylindrical.

17. The radial rolling bearing assembly of claim 1, wherein the connector sleeve includes a constant thickness from the first axial end to the second axial end.

18. A connector sleeve for a radial rolling bearing assembly adapted to connect first and second radial rolling bearings, comprising:
a deep drawn tubular body having a first axial end with a first connector formed by radially inwardly directed tabs, and a second axial end with a second connector formed by radially inwardly directed tabs, the radially inwardly directed tabs being formed as deformations in the tubular body,
wherein the tubular body includes a middle section having a first inner diameter and a first outer diameter, and opposing end sections having a second inner diameter unequal to the first inner diameter and a second outer diameter unequal to the first outer diameter, the radially inwardly directed tabs being formed in the opposing end sections, wherein the tubular body, including the middle section and the opposing end sections, includes a constant thickness from the first axial end to the second axial end.

* * * * *